United States Patent [19]  [11] Patent Number: 4,529,756
Salensky  [45] Date of Patent: Jul. 16, 1985

[54] SINGLE PACKAGE SOLVENT RESISTANT ZINC RICH THERMOPLASTIC POLYHYDROXYETHER COATINGS

[75] Inventor: George A. Salensky, Whitehouse Station, N.J.

[73] Assignee: Union Carbide Corporation, Danbury, Conn.

[21] Appl. No.: 662,896

[22] Filed: Oct. 19, 1984

[51] Int. Cl.$^3$ .............................................. C08K 3/08
[52] U.S. Cl. .................................. 523/459; 523/442; 523/455
[58] Field of Search .................. 523/442, 455, 459; 524/439

[56] References Cited

U.S. PATENT DOCUMENTS

| | | | |
|---|---|---|---|
| 3,399,160 | 8/1968 | Kemp | 523/459 |
| 4,370,382 | 1/1983 | Salensky | 523/459 |
| 4,417,007 | 11/1983 | Salensky et al. | 523/442 |
| 4,476,260 | 10/1984 | Salensky | 523/459 |

Primary Examiner—Lewis T. Jacobs
Attorney, Agent, or Firm—Bernard F. Crowe

[57] ABSTRACT

Zinc rich, solvent resistant and corrosion resistant coatings are prepared by blending zinc pigment, a thermoplastic polyhydroxyether and an organic dianhydride or polyanhydride.

12 Claims, No Drawings

SINGLE PACKAGE SOLVENT RESISTANT ZINC RICH THERMOPLASTIC POLYHYDROXYETHER COATINGS

BACKGROUND OF THE INVENTION

This invention pertains to zinc rich coatings with improved solvent resistance and more particularly to compositions containing thermoplastic polyhydroxyethers, and organic dianhydrides. These compositions also exhibit enhanced corrosion resistance.

The automotive industry has a need for zinc rich coatings which have both improved corrosion resistance and solvent resistance for applications related to fuel and functional fluid components. Presently, only two package systems, such as, isocyanate-cured phenoxy systems can provide solvent resistance.

Inasmuch as single package systems are preferred both for economic reasons and for facility of handling, it is an object of this invention to provide a single package zinc rich phenoxy coating system having solvent resistance.

It is another object of this invention to provide a single package zinc rich phenoxy coating system which exhibits corrosion resistance on metal substrates.

Other objects will become apparent to those skilled in the art upon a further reading of the specifications.

SUMMARY OF THE INVENTION

A zinc rich coating composition providing solvent resistance and enhanced corrosion resistance for metallic substrates has been found comprising:

(a) a thermoplastic polyhydroxyether;

(b) about 350 to about 1450 parts by weight of zinc pigment per 100 parts of thermoplastic polyhydroxyether;

(c) about 2 to about 20 parts by weight of an orgnanic di- or polyanhydride per 100 parts of thermoplastic polyhydroxyether;

(d) 0 to about 20 parts by weight of at least one suspending agent per 100 parts of thermoplastic polyhydroxyether;

(e) 0 to about 15 parts by weight of a thermosetting epoxy resin per 100 parts of thermoplastic polyhydroxyether; and (f) 0 to about 0.5 parts by weight per 100 parts of thermoplastic polyhydroxy ether of a catalyst selected from the class consisting of organic tertiary amines having at least 6 carbon atoms and stannous or zinc organo metallic salts.

Although about 2 to about 20 parts by weight of organic anhydride can be used per 100 parts of thermoplastic polyhydroxyether, it is preferred to use about 5 to about 10 parts.

Although 0 to about 15 parts of thermosetting epoxy resin can be used, it is preferred, when used, to employ about 5 to 10 parts per 100 parts of thermoplastic polyhydroxyether.

Although 0 to about 0.5 parts of catalyst can be used, it is preferred, when used, to employ 0.05 to about 0.15 parts per 100 parts of thermoplastic polyhydroxyether.

DESCRIPTION OF THE INVENTION

The zinc pigment used in this invention is commercially available and preferably has a particle size of about 2 to about 15 microns. It is preferred to use pigment having an average particle size of about 6 to about 7 microns.

The term "thermoplastic polyhydroxyether" herein refers to substantially linear polymers having the general formula:

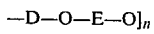

wherein D is the radical residuum of a dihydric phenol, E is an hydroxyl containing radical residuum of an epoxide and n represents the degree of polymerization and is at least 30 and is preferably 80 or more. The term "thermoplastic polyhydroxyether" is intended to include mixtures of at least two thermoplastic polyhydroxyethers.

The thermoplastic poly(hydroxyethers) can be prepared by admixing from about 0.985 to about 1.015 moles of an epihalohydrin with one mole of a dihydric phenol together with from about 0.6 to 1.5 moles of an alkali metal hydroxide, such as, sodium hydroxide or potassium hydroxide generally in an aqueous medium at a temperature of about 10° to about 50° C. until at least about 60 mole percent of the epihalohydrin has been consumed. The thermoplastic poly(hydroxyethers) thus produced have reduced viscosities of at least about 0.4. Reduced viscosity values were computed by use of the equation:

$$\text{Reduced Viscosity} = \frac{t_s - t_o}{ct_o}$$

wherein $t_o$ is the efflux time of the solvent (tetrahydrofuran, $t_s$ is the efflux time of the poly(hydroxyether) solution, c is the concentration of the poly(hydroxyether) solution in terms of grams of poly(hydroxyether) per 100 ml. of tetrahydrofuran.

The dihydric phenol contributing the phenol radical residuum, D, can be either a dihydric mononuclear or a dihydric polynuclear phenol such as those having the general formula:

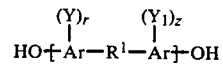

wherein Ar is an aromatic divalent hydrocarbon such as naphthylene and, preferably, phenylene, Y and $Y_1$ which can be the same or different are alkyl radicals, preferably having from 1 to 4 carbon atoms, halogen atoms, i.e., fluorine, chlorine, bromine and iodine, or alkoxy radicals, preferably having from 1 to 4 carbon atoms, r and z are integers having a value from 0 to a maximum value corresponding to the number of hydrogen atoms on the aromatic radical (Ar) which can be replaced by substituents and $R^1$ is a bond between adjacent carbon atoms as in dihydroxydiphenyl or is a divalent radical including, for example

—O—, —S—, —SO—, —SO$_2$— and —S—S—, and divalent hydrocarbon radicals such as alkylene, alkylidene, cycloaliphatic, e.g., cycloalkylidene, halogenated alkoxy or aryloxy substituted alkylene, alkylidene and cycloaliphatic radicals as well as alkarylene and aromatic radicals including halogenated, alkyl, alkoxy or aryloxy substituted aromatic radicals and a ring fused to an Ar group; or R¹ can be polyalkoxy, or polysiloxy, or two or more alkylidene radicals separated by a aromatic ring, a tertiary amino group, an ether linkage, a carbonyl group or a sulfur containing group such as sulfoxide, and the like.

Examples of specific dihydric polynuclear phenols include among others:

The bis(hydroxyphenyl) alkanes such as
2,2-bis-(4-hydroxyphenol)propane,
2,4'-dihydroxydiphenylmethane,
bis(2-hydroxyphenyl)methane,
bis(4-hydroxyphenyl)methane,
bis(4-hydroxy-2,6-dimethyl-3-methoxyphenyl)methane,
1,1-bis(4-hydroxyphenyl ethane,
1,2-bis(4-hydroxyphenyl)-ethane,
1,1-bis(4-hydroxy-2-chlorophenyl)ethane,
1,1-bis-(3-methyl-4-hydroxyphenyl)ethane,
1,3-bis(3-methyl-4-hydroxyphenyl)propane,
2,2-bis(3-phenyl-4-hydroxyphenyl)-propane,
2,2-bis(3-isopropyl-4-hydroxyphenyl)propane,
2,2-bis(2-isopropyl-4-hydroxyphenyl)propane,
2,2-bis-(4-hydroxylnaphthyl)propane,
2,2-bis(4-hydroxyphenyl)-pentane,
3,3-bis(4-hydroxyphenyl)pentane,
2,2-bis(4-hydroxyphenyl)heptane,
bis(4-hydroxyphenyl)phenylmethane,
bis(4-hydroxyphenyl)cyclohexylmethane,
1,2-bis(4-hydroxy-phenyl-1,2-bis(phenyl)propane,
2,2,-bis(4-hydroxyphenyl)-1-phenyl-propane and the like;

Di(hydroxyphenyl)sulfones such as bis(4-hydroxyphenyl)sulfone, 2,4'-dihydroxydiphenyl sulfone, 5'-chloro-2,4'-dihydroxydiphenyl sulfone, 5'-chloro-4,4'-dihydroxydiphenyl sulfone and the like:

Di(hydroxyphenyl)ethers such as
bis(4-hydroxy-phenyl)ether, the 4,3'-, 4,2'-, 2,2'-, 2,3'-, di-hydroxydiphenyl ethers,
4,4'-dihydroxy-2,6-dimethyldiphenyl ether,
bis(4-hydroxy-3-isobutylphenyl)ether,
bis(4-hydroxy-3-isopropylphenyl)ether,
bix(4-hydroxy-3-chlorophenyl)-ether,
bis(4-hydroxy-3flurophenyl)ether, bis(4-hydroxy-3-bromophenyl)ether,
bis(4-hydroxynaphthyl)ether,
bis(4-hydroxy-3-chloronaphthylether,
bis(2-hydroxydiphenyl)-ether,
4,4'-dihydroxy-2,6-dimethoxydiphenyl ether,
4,4-dihydroxy-2,5-diethoxydiphenyl ether, and the like.

Also suitable are the bisphenol reaction products of 4-vinylcyclohexene and phenols, e.g., 1,3-bis(p-hydroxyphenyl)-1-ethylcyclohexane and the bis-phenol reaction products of dipentene or its isomers and phenols such as 1,2-bis(p-hydroxyphenyl)-1-methyl-4-isopropylcyclohexane as well as bisphenols such as 1,3,3'trimethyl-1-(4-hydroxyphenyl)-6-hydroxyindane, and 2,4-bis(4-hydroxyphenyl)-4-methylpentane, and the like.

Particularly desirable dihydric polynuclear phenols have the formula

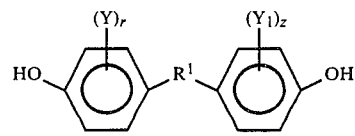

wherein Y and Y₁ are as previously defined, r and z have values from 0 to 4 inclusive and R¹ is a divalent saturate aliphatic hydrocarbon radical, particularly alkylene and alkylidene radicals having from 1 to 3 carbon atoms, and cycloalkylene radicals having up to and including 10 carbon atoms.

Mixtures of dihydric phenols can also be employed and whenever the term "dihydric phenol" or "dihydric polynuclear phenol" is used herein, mixtures of these compounds are intended to be included.

The epoxide contributing the hydroxyl containing radical residuum, E, can be monoepoxide or diepoxide. By "epoxide" is meant a compound containing an oxirane group, i.e., oxygen bonded to two vicinal aliphatic carbon atoms, thus,

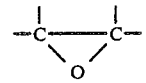

A monoepoxide contains one such oxirane group and provides a radical residuum E containing a single hydroxyl group, a diepoxide contains two such oxirane groups and provides a radical residuum E containing two hydroxyl groups. Saturated epoxides, by which term is meant diepoxides free of ethylenic unsaturation, i.e., $>C=C<$ and acetylenic unsaturation, i.e., $—C\equiv C—$, are preferred. Particularly preferred are halogen substituted saturated monoepoxides, i.e., the epihalohydrins and saturated diepoxides which contain solely carbon, hydrogen and oxygen, especially those wherein the vicinal or adjacent carbon atoms form a part of an aliphatic hydrocarbon chain. Oxygen in such diepoxides can be, in addition to oxirane oxygen, ether oxygen —O—, oxacarbonyl oxygen

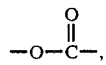

carbonyl oxygen

and the like.

Specific examples of monoepoxides include epichlorohydrins such as epichlorohydrin, epibromohydrin, 1,2-epoxy-1-methyl-3-chloropropane, 1,2-epoxy-1-butyl-3-chloropropane, 1,2-epoxy-2-methyl-3-fluoropropane, and the like.

Illustrative diepoxides include diethylene glycol bis(3,4-epoxycyclohexane-carboxylate), bis(3,4-epoxycyclohexyl-methyl)adipate, bis(3,4-epoxycyclohexylmethyl)phthalate, 6-methyl-3,4-epoxycyclohexylmethyl-6-methyl-3,4-epoxycyclohexane carboxylate, 2-chloro-3,4-epoxycyclohexylmethyl-2-chloro-3,4-epoxycyclohexane-carboxylate, diglycidyl ether, bis(2,3-epoxycyclopentyl)-ether, 1,5-pentanediol bis(4-methyl- 3,4-epoxycyclohexyl-methyl)ether, bis(2,3-epoxy-2-ethylhexyl)adipate, diglycidyl maleate, diglycidyl phthalate, 3-oxa-tetracyclo[4.4.0.1$^{7,10}$.0$^{2,4}$]-undec-8-yl 2,3-epoxy-propyl ether, bis(2,3-epoxycyclopentyl)sulfone, bis(3,4-epoxyhexoxypropyl)sulfone, 2,2'-sulfonyl-diethyl, bis(2,3-epoxycyclopentanecarboxylate), 3-oxatetracyclo-[4.4.0.1$^{7,10}$.0$^{2,4}$]-undec-8-yl 2,3-epoxybutyrate, 4-pentenal-di-(6-methyl-3,4-epoxycyclohexyl-methyl)acetal, ethylene glycol bis(9,10-epoxystearate), diglycidyl carbonate, bis(2,3-epoxybutylphenyl)-2-ethylhexyl phosphate, diepoxydioxane, butadiene dioxide, and 2,3-dimethyl butadiene dioxide. The preferred diepoxides are those wherein each of the oxirane groups is connected to an electron donating substituent which is not immediately connected to the carbon atoms of that oxirane group. Such diepoxides have the grouping

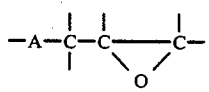

wherein A is an electron donating substituent such as

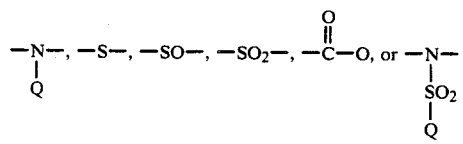

and Q is a saturated hydrocarbon radical such as an alkyl, cycloalkyl, aryl or aralkyl radical.

Although about 350 to about 1450 parts by weight of zinc pigment per 100 parts of thermoplastic polyhydroxyether can be used, it is preferred to employ about 400 to about 1300 parts by weight per 100 parts.

The preferred polyhydroxyether is available commercially as Bakelite Phenoxy PKHH, a trade designation of Union Carbide Corporation for a condensation polymer derived from bisphenol-A (2,2-bis(p-hydroxyphenyl)propane and epichlorohydrin having the structural formula:

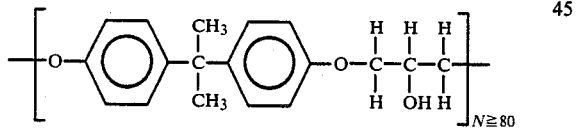

The phenoxy resin is available as a solution in glycol esters such as Cellosolve acetate (the acetate of a monoalkyl glycol ether sold under the Trademark Cellosolve by Union Carbide Corporation) or in pellet form which is readily soluble in a variety of solvents and solvent blends. The solid phenoxy resin sold under the designation PKHH by Union Carbide Corporation is soluble in the following solvents: butyl Carbitol, butyl Carbitol acetate, butyl Cellosolve, Carbitol solvent, Cellosolve acetate, Cellosolve solvent, diacetone alcohol, diethyl Carbitol, dimethylformamide, dimethyl sulfoxide, dioxane, ethoxy triglycol, mesityl oxide, methyl Cellosolve acetate, methyl ethyl ketone, and tetrahydrofuran.

Carbitol is a Trademark of Union Carbide Corporation for the monoalkyl ether of diethylene glycol.

Where suspending agents are used their nature is not critical an thus one can employ low molecular weight polyolefins, silane treated pyrogenic silica, quarternary amine treated hydrous magnesium alumninum silicate, and the like.

Suitable solvents are used in applying the coating composition to the particular metallic substrate. The solvents used depend upon the nature of the application method. Thus for example, in spray coating it has been found useful to employ a mixture containing an aliphatic ketone having about 3 to 6 carbons and aromatic hydrocarbons containing about 7 to 9 carbons plus optional aliphatic alcohols containing about 3 to 5 carbons, and the like. For roller-type applications one can use a mixture of Cellosolve acetate and aromatic hydrocarbons containing 7 to 12 carbons, and the like. It is convenient to use glycol esters such as Cellosolve acetate, (the acetate of a mono-alkyl glycol ether sold under the Trademark Cellosolve by Union Carbide Corporation).

The preparation of the above described polyhydroxyethers is described in U.S. Pat. No. 3,305,528.

In addition to these polyhydroxyethers one may also employ the linear thermoplastic polyethers described in U.S. Pat. No. 3,177,089, U.S. Pat. No. 3,306,872, and U.S. Pat. No. 2,602,075.

A wide variety of organic polyanhydrides can be used in the practice of this invention including aromatic, mixed aromatic-aliphatic, aliphatic and the like. The range extends from organic dianhydrides to polymers containing a plurality of anhydride groups. Representative examples include:

benzophenone tetracarboxylic dianhydride

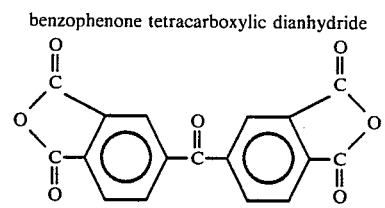

pyromellitic dianhydride

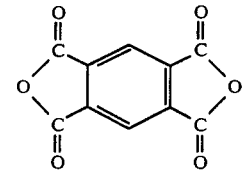

cyclopentane tetracarboxylic dianhydride

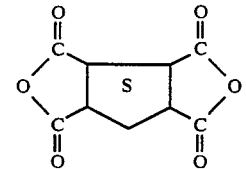

ethylene glycol bistrimellitate

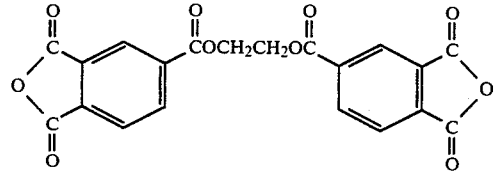

glycerol tristrimellitate

-continued

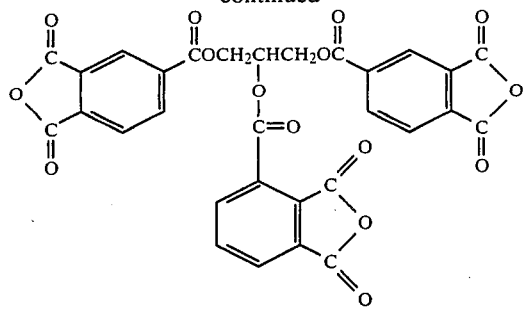

3, 4, 9, 10 perylene tetracarboxylic dianhydride

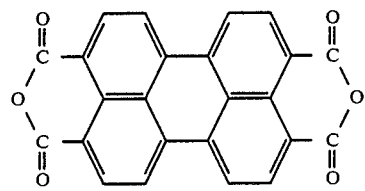

aromatic-maleic anhydride copolymers

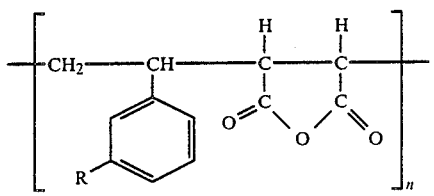

wherein
n = 2-8
R = R, or $C_1$-$C_9$ alkyl
aliphatic maleic anhydride copolymers

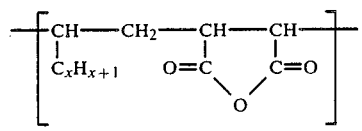

wherein
n = 2-10
x = 6-18
polymaleic anhydride

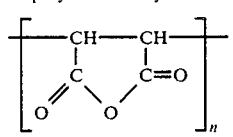

wherein n = 2-10
3,4,3', 4', benzhydro tetracarboxylic dianhydride,

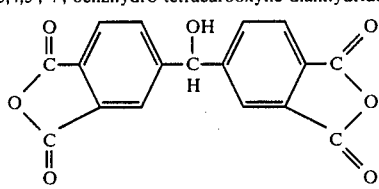

and the like.

The single package solvent and corrosion resistant zinc rich phenoxy coatings of this invention require a cure in the range of about 150° C. to about 300° C. after being placed on the appropriate substrate in order to develop the optimum solvent and corrosion resistance. The nature of the substrate is not narrowly critical but it should be able to withstand cure temperatures in excess of 150° C. The invention has been demonstrated by using SAE 1010 cold rolled steel as the substrate. It will be understood by those skilled in the art that may other substrates can also be used, the invention not being limited to cold rolled steel. For example, other substrates include sand blasted, hot rolled steel, zinc phosphate cold rolled steel (Bonderite), zinc flake-chrome primer (Dacromat), aluminum, zinc coated steel and the like.

While not wishing to be bound by any theory or hypothetical explanation, it is believed that the superior results achieved with the composition of this invention are due to the fact that the organic di- or polyanhydride serves two purposes. It reacts with the secondary hydroxyl groups of the phenoxy resin to form acid half esters which can form complexes with zinc cations leached from the zinc pigment and thereby form an in situ corrosion inhibitor. Secondly, the anhydride can react with two hydroxyls at elevated temperatures to cross-link the phenoxy resin and thus provide solvent resistance. All of this is achieved without the necessity for adding any inorganic compounds to the coating composition which might impair the welding properties of the coating substrate.

TESTS

The invention was demonstrated by salt spray tests performed in accordance with ASTM B-117, solvent resistance tests and reverse impact tests, all of which are explained below:

Solvent resistance was evaluated by the MEK rub test where a cotton cheese cloth is saturated with methyl ethyl ketone and rubbed with hand pressue on the coating until coating failure occurs. A complete forward and reverse motion constitutes one rub.

Inpact resistance was evaluated by ASTM D-2794-69 wherein the reverse side of the coated steel panel was impacted.

The invention is further described in the examples which follow. All parts and percentages are by weight unless otherwise specified.

EXAMPLE 1

The coating formulations of the instant invention were prepared as follows:

Polyhydroxy ether resin, Union carbide Phenoxy PKHH was dissolved in 2-methoxyethyl ether (dimethyl Carbitol or DMC) which was contacted with molecular sieves to remove moisture. A 25% solids solution was prepared in a ball mill.

The zinc rich coating was prepared using the following procedure. Ingredient 1 shown in Table 1 was charged to a stainless steel beaker and placed under a high speed saw tooth mixer of the Cowles type. A dry nitrogen source was placed into the beaker to act as a dry blanket to prevent moisture absorption from the air. Ingredients 2-4 were added successfully at a medium speed and speed was raised to maximum and maintained for 10 minutes untila Hegman grind of 5+ was obtained. The mixture was then cut back with ingredient 6. When this was uniformly blended, ingredient 7, 8, 9 and 10 were added to finish the coating which was then packaged.

Ingredient 2 is a silane treated silica, Degussa Aerosil R-972. MPA-60 is proprietary low molecular weight polyethylene based compound dispersed in xylene to form a 60% solids paste. Zinc Pigment is Federated Metals L-15. BTDA is benzophenone tetracarboxylic acid dianhydride sold by Gulf Chemicals. Epoxide Epon 1002 is a solid diglycidyl eher of bisphenol A with an epoxy equivalent weight of 600–700 grams per gram equivalent of epoxide. DABCO is the commercial name for triethylene diamine sold by Air Products.

The coatings were applied to cold rolled steel (Q steel) by a doctor blade to give a 0.8 mil dry film thickness when baked at 375° F. for 20 minutes. The coated steel specimens were then submitted for salt spray testing (ASTM B-117) and Humidity Exposure (ASTM D-2247).

Other coated panels were checked for impact properties and solvent resistance which are shown in Table 2.

Impact properties were found to be over 160 inch pounds for all three coated panels when impacted at the opposite or reverse side of the coated panel using a Gardner Impact tester (ASTM D-2794-69) demonstrating that there was no loss of flexibility as a result of the dianhydride modification to improve solvent resistance.

Solvent resistance was evaluated by the MEK rub test where a cotton cheese cloth is saturated with methyl ethyl ketone and rubber with hand pressure on the coating until coating failure occurs. A complete forward and reverse motion constitutes one rub. As may be seen in Table 2, system 2 and 3 which contains the dianhydride resist more than 100 rubs compared to only 3 for the control. Solvent resistance is important in various applications, particularly the automotive type, where exposure to hydraulic fluids and the newer aromatic-hydrocarbon type and alcohol blended fuels are encountered.

Coatings 1, 2 and 3 were examined periodically for shelf life. All three samples were still fluid after 2 months indicating that the dianhydride addition was not effecting the shelf life of the coatings which therefore can then be produced as single package systems.

The salt spray resistance of the coatings were shown in Table 3. ASTM standards were used for rating the corrosion or rusting of the panels (ASTM D-610). Corrosion is rated from 10 (no change) to 0 for complete failure. Table 3 shows that the dianhydride containing coatings have a rating of 7 versus 4 for the control after 1000 hours. At 1265 hours, the control had failed completely and compared to 6 ratings for the BTDA containing coatings. Composition 3 contains an additional ingredient, an epoxy resin to scavenge or react with any excess carboxyl groups. It performs similar to composition 2.

TABLE 1

| | Coating Number | | |
|---|---|---|---|
| | 1 | 2 | 3 |
| 1. PKHH/DMC (25% Solids) | 17.22 | 17.22 | 17.22 |
| 2. Treated Silica | 0.48 | 0.48 | 0.48 |
| 3. MPA-60 | 1.60 | 1.60 | 1.60 |
| 4. CaO | 0.26 | 0.26 | 0.26 |
| 5. Zinc Pigment | 54.08 | 54.08 | 54.08 |
| 6. Add PKHH/DMC (25% Solids) | 8.61 | 8.61 | 8.61 |
| 7. Add PKHH/DMC (25% Solids) | 8.61 | 7.44 | 4.08 |
| 8. BTDA/25% DMF (Dimethyl formamide) | — | 3.32 | 3.32 |
| 9. Epoxide Epon 1002/DMC 50% | — | — | 1.68 |
| 10. DABCO/DMC - 1% Solids | | 1.00 | 1.00 |

TABLE 2

| | Coating Number | | |
|---|---|---|---|
| | 1 | 2 | 3 |
| Solvent Resistance - MEK Rubs | 3 | >100 | >100 |
| Reverse Impact >160 inch pounds - all panels, | | | |
| Baked 375° F. for 20 min. cold rolled steel. | | | |

TABLE 3

SALT SPRAY RESISTANCE DFT 0.8 mils

| | Coating Number | | |
|---|---|---|---|
| Corrosion | 1 | 2 | 3 |
| Exposure (Hrs.) | | | |
| 750 | 6 | 7 | 7 |
| 1000 | 4 | 7 | 7 |
| 1265 | 0 | 6 | 6 |

TABLE 4

Humidity Resistance (140° F.) DFT 0.8 mils

| | Coating Number | | |
|---|---|---|---|
| | 1 | 2 | 3 |
| Corrosion | | | |
| Exposure (Hrs) 3000 | none | none | none |
| Blisters (ASTM D-714) | | | |
| Exposure (Hrs) 3000 | 6-8 M. | none | 8 F. |

Panel coated with Composition 1 had medium density number 6–8 blisters whereas panel of composition 3 had low density (few) of number 8 blisters.

Composition 2 panel showed no blisters.

The data from Table 3 and Table 4 indicate that the dianhydride modifications of the zinc rich coating do not degrade corrosion resistance but improve the protective properties of the coatings on cold rolled steel.

EXAMPLE 2

Preparation of formulations with other organic solvents is demonstrated herein. The following formulations were made using Cellosolve acetate as a solvent instead of dimethyl Carbitol (DMC). In these cases, the BTDA was dispersed in Cellosolve acetate (CA) and compared against a composition prepared with a solution of BTDA in DMF. Although BTDA is soluble in DMF, it is not soluble in Cellosolve acetate and must be incorporated as a dispersion.

Table 5 shows the compositions of these coatings.

Compositions 4 and 5 are based on using a regular powder grade of BTDA which was dispersed in Cellosolve acetate in a ball mill. Composition 5 contains the epoxide whereas Composition 4 does not. Composition 6 differs in that the BTDA is incorporated as a dimethyl formamide (DMF) solution similar to Compositions 2 and 3. Composition 7 utilizes micronized BTDA which is simply mixed into Cellosolve acetate with an air stirrer. The objective was to determine if the BTDA is equally effective as a cross linker when utilized by any of the above methods.

TABLE 5

| | 4 | 5 | 6 | 7 |
|---|---|---|---|---|
| PKHH/Cellosolve Acetate —25% Solids | 17.22 | 17.22 | 17.22 | 17.22 |
| R-972 | 0.48 | 0.48 | 0.48 | 0.48 |
| MPA-60-X | 1.60 | 1.60 | 1.60 | 1.60 |
| Calcium Oxide | 0.26 | 0.26 | 0.26 | 0.26 |
| Zinc L-15 | 54.08 | 54.08 | 54.08 | 54.08 |
| Grind on Cowles 10 mins. at top speed and let down with | 8.61 | 8.61 | 8.61 | 8.61 |

TABLE 5-continued

|  | 4 | 5 | 6 | 7 |
|---|---|---|---|---|
| 25% PKHH/CA. Hegman Grind 5.5 |  |  |  |  |
| Add PKHH/CA 25% solids | 7.44 | 4.08 | 7.44 | 7.44 |
| BTDA/CA 25% solids (ball mill grind) | 3.32 | 3.32 | — | — |
| Epoxide Epon 1002/50% CA | — | 1.68 | — | — |
| DABCO/DMC, 1% | 1.00 | 1.00 | 1.00 | 1.00 |
| BTDA/DMF, 25% | — | — | 3.32 | — |
| BTDA (micronized) in CA (air stirrer mixed) 25% | — | — | — | 3.32 |

Cold rolled steel panels were coated to 0.8 mils dry film thickness and baked at 375° F. (190° C.) for 20 minutes.

|  | 4 | 5 | 6 | 7 |
|---|---|---|---|---|
| Solvent Resistance - MEK Rubs | >100 | >100 | >100 | >100 |

The data shown that the BTDA employed either as a solution or dispersion is equally effective in providing solvent resistance to the zinc rich polyhydroxy ether coating. The solvent resistance obtained with the above coatings dissolved in Cellosolve acetate is equivalent to the coatings prepared in Table 1, compositions 2 and 3, which use dimethyl Carbitol as a solvent.

In addition, the shelf stability of the uncured coatings are equally good since the above compositions were found to be fluid after 4 months storage at ambient temperature.

Compositions 4 and 5 demonstrated good salt spray resistance on cold rolled steel when baked for 20 minutes at 375° F. This is delineated in Table 6.

TABLE 6

| Salt Spray Resistance | DFT 0.8 mils Coating Number | |
|---|---|---|
| Corrosion | 4 | 5 |
| Exposure (Hrs) |  |  |
| 760 | 9 | 9 |
| 1000 | 9 | 9 |
| 1261 | 8 | 7 |

If is desired to further enhance the corrosion resistance of the compositions of this invention, organosilanes, such as those delineated in U.S. Pat. No. 2,846,458 can be employed.

Although the invention was described in its preferred forms with a certain degree of particularity, it will be understood by those skilled in the art that the present disclosure has been made only by way of example and that numerous changes can be made without departing from the spirit and scope of the invention.

I claim:

1. Solvent and corrosion resistant coating composition comprising:
   (a) a thermoplastic polyhydroxyether;
   (b) about 350 to about 1450 parts by weight of zinc pigment per 100 parts of thermoplastic polyhydroxyether;
   (c) about 2 to about 20 parts by weight of an organic di- or polyanhydride per 100 parts of thermoplastic polyhydroxyether;
   (d) 0 to about 20 parts by weight of at least one suspending agent per 100 parts of thermoplastic polyhydroxyether;
   (e) 0 to about 15 parts by weight of a thermosetting epoxy resin per 100 parts of thermoplastic polyhydroxyether; and
   (f) 0 to about 0.5 parts by weight, per 100 parts of thermoplastic polyhydroxyether, of a catalyst selected from the class consisting of organic tertiary amines having at least 6 carbon atoms and stannous or zinc organo-metallic salts.

2. Composition claimed in claim 1 wherein the thermoplastic polyhydroxyether is a reaction product of substantially equimolar amounts of a polynuclear dihydric phenol an epichlorohydrin, said thermoplastic polyhydroxyether having a degree of polymerization of at least about 80.

3. Composition claimed in claim 2 wherein the polynuclear dihydric phenol is 2,2-bis(4-hydroxyphenyl)-propane.

4. Composition claimed in claim 1 wherein the organic dianhydride is pyromellitic dianhydride.

5. Composition claimed in claim 1 wherein the organic dianhydride is cyclopentane tetracarboxylic dianhydride.

6. Composition claimed in claim 1 wherein the organic dianhydride is benzophenone tetracarboxylic dianhydride.

7. Composition claimed in claim 1 wherein the organic dianhydride is ethylene glycol bistrimellitate.

8. Composition claimed in claim 1 wherein the organic dianhydride is glycerol tristrimellitate.

9. Composition claimed in claim 1 wherein the organic dianhydride is 3,4,9,10-perylene tetracarboxylic dianhydride.

10. Composition claimed in claim 1 wherein the organic dianhydride is a styrene-maleic anhydride copolymer having 2 to 8 repeating units.

11. Composition claimed in claim 1 wherein the organic dianhydride is a copolymer of ethylene and maleic anhydride having about 2 to about 10 repeating units.

12. Composition claimed in claim 1 wherein the organic dianhydride is polymaleic anhydride wherein the number of repeating units ranges from about 2 to about 10.

* * * * *